(12) United States Patent
Gonzales

(10) Patent No.: US 11,274,055 B2
(45) Date of Patent: Mar. 15, 2022

(54) SYSTEM FOR THE PURIFICATION AND PHYSICAL-CHEMICAL ADJUSTMENT OF WATER AND USE OF THE WATER OBTAINED

(71) Applicant: MVA PARTICIPAÇÕES & CONSULTORIA LTDA., Minas Gerais (BR)

(72) Inventor: Marcio Augusto Ferreira Gonzales, Nova Lima (BR)

(73) Assignee: MVA PARTICIPAÇÕES & CONSULTORIA LTDA., Belo Horizonte (BR)

( * ) Notice: Subject to any disclaimer, the term of this patent is extended or adjusted under 35 U.S.C. 154(b) by 54 days.

(21) Appl. No.: 16/642,864

(22) PCT Filed: Aug. 27, 2018

(86) PCT No.: PCT/BR2018/050306
§ 371 (c)(1),
(2) Date: Feb. 27, 2020

(87) PCT Pub. No.: WO2019/041010
PCT Pub. Date: Mar. 7, 2019

(65) Prior Publication Data
US 2021/0070643 A1 Mar. 11, 2021

(30) Foreign Application Priority Data

Aug. 28, 2017 (BR) .......................... 102017018435-8
Jun. 28, 2018 (BR) .......................... 102018013293-8

(51) Int. Cl.
*C02F 9/00* (2006.01)
*A23L 2/52* (2006.01)
(Continued)

(52) U.S. Cl.
CPC ................ *C02F 9/00* (2013.01); *A23L 2/52* (2013.01); *A23V 2002/00* (2013.01);
(Continued)

(58) Field of Classification Search
None
See application file for complete search history.

(56) References Cited

U.S. PATENT DOCUMENTS

2011/0303618 A1* 12/2011 Cueman .................. C02F 1/003
 210/767
2021/0070643 A1* 3/2021 Gonzales .................. A23L 2/52

FOREIGN PATENT DOCUMENTS

CN 103880213 A 6/2014
CN 104860435 A 8/2015
(Continued)

*Primary Examiner* — Chester T Barry
(74) *Attorney, Agent, or Firm* — Maschoff Brennan

(57) ABSTRACT

The structural principals and functions found in the present invention are applicable to the sector of purification, physical-chemical adjustments and packaging of water for human consumption. An object of the present invention is a system of purification, physical-chemical adjustment, adding mineral salts, and packaging of water for human consumption, comprising the following elements: a pump that captures water from the groundwater or other water source and stores it in a tank, a high pressure pump, a heat exchanger of inter plates exchangeable; a high pressure silica filter; a high pressure activated carbon filter; an ion changer; means for the addition of strong bases to adjust the hydrogen concentration; a precision filter; a dual reverse osmosis system; a hydrogen concentration sensor interconnected to the media for the addition of strong base for adjustment of hydrogen concentration; storage tank; a second high pressure pump; an ozone application system; means of adding mineral salts; means of adding magnesium salts; a storage tank; and a set of machines for filling the unique packaging in sachets, (Continued)

constructed with a mixture of LDPE and LDPE with linear structure of the monomers, to be used for filling only once, comprising weld lines; the contour of weld lines mainly simulating the shape of a bottle, showing a neck and a line, indicating to user the best portion of neck for performing the opening of the sachet that has external printings including useful information to users.

7 Claims, 3 Drawing Sheets

(51) Int. Cl.
*C02F 1/00* (2006.01)
*C02F 1/02* (2006.01)
*C02F 1/28* (2006.01)
*C02F 1/42* (2006.01)
*C02F 1/44* (2006.01)
*C02F 1/66* (2006.01)
*C02F 1/68* (2006.01)
*C02F 1/78* (2006.01)
*C02F 101/12* (2006.01)
*C02F 101/20* (2006.01)
*C02F 101/30* (2006.01)
*C02F 101/32* (2006.01)

(52) U.S. Cl.
CPC ............... *C02F 1/001* (2013.01); *C02F 1/02* (2013.01); *C02F 1/283* (2013.01); *C02F 1/42* (2013.01); *C02F 1/441* (2013.01); *C02F 1/66* (2013.01); *C02F 1/68* (2013.01); *C02F 1/78* (2013.01); *C02F 2001/422* (2013.01); *C02F 2001/425* (2013.01); *C02F 2101/12* (2013.01); *C02F 2101/20* (2013.01); *C02F 2101/308* (2013.01); *C02F 2101/32* (2013.01); *C02F 2209/06* (2013.01); *C02F 2209/30* (2013.01); *C02F 2303/04* (2013.01)

(56) References Cited

FOREIGN PATENT DOCUMENTS

| | | | |
|---|---|---|---|
| CN | 106565028 A | 4/2017 | |
| DE | 19805317 A1 * | 8/1999 | ........... B01D 61/022 |

* cited by examiner

SYSTEM FOR THE PURIFICATION AND PHYSICAL-CHEMICAL ADJUSTMENT OF WATER AND USE OF THE WATER OBTAINED

TECHNICAL FIELD OF THE INVENTION

The constructive principles and functions found in the present invention are applicable to the field of purification, physical-chemical adjustments, and packaging of alkaline, ionic, ozonized, isotonic, antioxidant, detox and magnesium-rich water for human consumption in unique green bottles by modular, portable and low cost installations.

PRIOR ART DESCRIPTION

There are several systems in the marked designed to purification and suitability of water from different sources in view of posterior human consumption.

For human consumption, water having hydrogen concentration (quantified by pH value) ranging between 7 and 12 (preferentially between 8.5 and 10.5), as well as the broad provision of mineral salts, mainly magnesium, in the range between 20 and 60 mg per Liter of water, preferentially, higher than 40 mg per Liter.

The current state of the art includes some patent documents dealing with water purification processes, such as the Chinese document CN 205856183U, which describes a process aiming cold purification of water, but it is not recommended for human consumption. Another example, document CN 103880213 also describes a cold purification process of water, involving enormous installations and it does not address the issue of suitable packaging in order to simplify the competitive access to consumers. Regarding packaging, we found a North American document U.S. 8,303,182B2 describing packages with two welds, mix of polymers, and great generation of solid residues per volume of liquid.

Solutions known from the state of the art involves machinery and processes performed in great scale installations, requiring big investments in land, infrastructure, and high fixed costs. Therefore, there is a need for industrial system for the purification, physical-chemical adjustment, and packaging of water for human consumption having decreased scales, allowing variety of its installation, operation in lower areas having lower requirement of infrastructure, and great convenience for reaching the final consumer.

It is still verified in the state of the art a clear demand of healthier water for human consumption, packaged in inviolable, recyclable, "green bottle" with the lowest generation of solid residues per mL of water, higher energy efficiency and low $CO_2$ emission to produce freeze, and transport, obtained by a system installed and operated in miniature areas and presenting minimal requirements of infrastructure.

BRIEF DESCRIPTION OF THE INVENTION

An object of the present invention is a system for the purification, physico-chemical adjustment, and packaging of water for human consumption, comprising the following elements:

A pump (1) that captures water from the groundwater or another source of water and stores it in a tank (2), a high pressure pump (3), an interchangeable plate heat exchanger (4); a high-pressure silica filter (5); a high-pressure activated carbon filter (6); an ion exchanger (7); means for adjusting the concentration of hydrogen (8) (not shown in the figure); a precision filter (9); a double reverse osmosis system (10); a hydrogen concentration sensor (11) connected to the means for adjusting the hydrogen concentration (8); a storage tank (12); a second high pressure pump (13); an ozone application system (14); means for adding mineral salts (15); means for adding magnesium salts (16); a storage tank (17); and a set of machines for filling single packages (18) as sachets (30), constructed with a mixture of LDPE and LDPE with linear structure of the monomers, to be used for filling only once, comprising cold weld lines (31); the contour of weld lines mainly simulating the shape of a bottle, showing a neck (34) and a line (36), indicating to user the best portion of neck (34) for performing the opening of the sachet (30) that has external printings (35) including useful information to users.

OBJECTS OF THE PRESENT INVENTION

The aim of the present invention is to provide widely health, environment preservation and social development through human water consumption. This alkaline water is produced from any source of water as rain, sea, river, lake or groundwater, with minimum energy consumption, less $CO_2$ emission, less plastic residues, through a compact system that purifies, alkalinizes, salinize, ozonize and, bottle water in a disruptive way for human consumption, with extremely low investments, infrastructure and operational costs, enabling its multiple compact installation everywhere around the globe.

It is still an object of the present invention to provide water of higher and unprecedented quality for human consumption, packed in environmentally friendly, tamper-resistant, recyclable, and thermally effective bottle, generating the lowest weight and volume of solid residues per mL of packed water, less $CO_2$ emission and fossil fuel consumption lighter for transportation and handling, obtained by means of a compact packaging system with minimal requirements of infrastructure, enabling the multiplication of such utilities in all regions of the world.

DETAILED DESCRIPTION OF THE INVENTION

Figure 1:
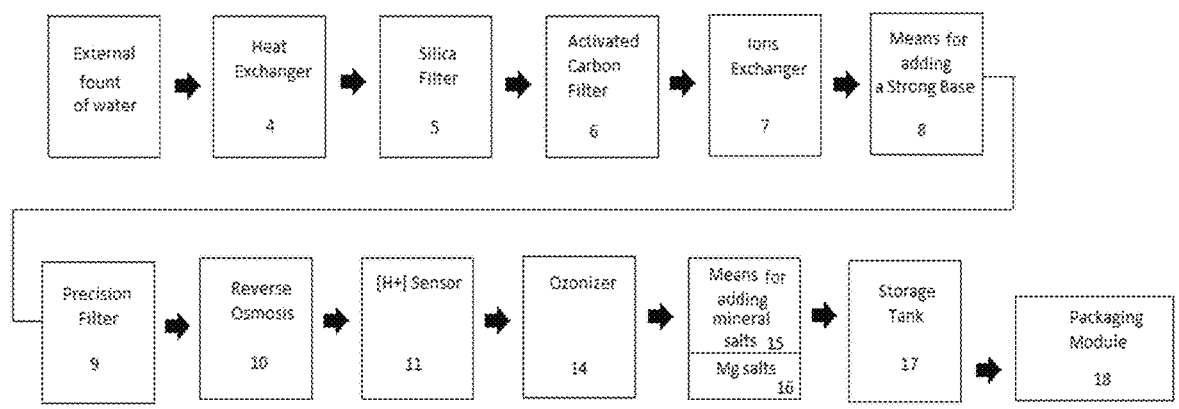
FIG. 1 depicts a flowchart of the main steps of the processes comprised in system of the present invention.

First, the system must be coupled to a water source, the room temperature, around 25° C. which can come from the ground, river, lake, sea, rain, among other sources, whether through a pump pressure (1) operating between 0.1 and 0.3 atm, preferably at 0.2 atm, transfers the water to a stainless steel tank (2).

When leaving said reservoir (2), under the effect of a high pressure pump (3) that operates between 1 and 2 atm, preferably 1.5 atm, the water reaches a pressure of 1.5 atm and passes through an exchanger heat of interchangeable plates (4) in which an initial heating of the water occurs, between 50 and 70° C., preferably 60° C. Under these conditions, the water has a dynamic viscosity of 0.4668 mPa/s and a surface tension of about $6.6 \times 10^{-2}$ N/m according to literature data. These changes in the physical-chemical properties of water result in greater efficiency in the following filtration processes. Then, the heated water and under high pressure is conducted to a high pressure silica filter (5) whose function is to remove suspended solid particles with dimensions between 20 and 100 microns. Then the water is guided by a high pressure activated carbon filter (6); and by an ion exchanger (7).

When leaving the ion exchanger (7), the hydrogen concentration is adjusted by alkalinizing the water through the addition of defined volumes of strong bases, such as, for example, NaOH or KOH, by means of addition. Such addition means, not shown in FIG. 2, comprise two small reservoirs each containing aqueous solutions of NaOH and KOH and pumps for infusing them in the flow of freshly filtered through water. The NaOH solution in the reservoir should have a concentration ranging between 8 and 12%, preferably 10%, and the KOH solution should have a concentration ranging between 8 and 12%, preferably 10%. Such addition of defined volumes of NaOH and/or KOH occurs in accordance with the reading of the hydrogen concentration, by means of a sensor (11) positioned after the exit of water passing through reverse osmosis.

Figure 2:
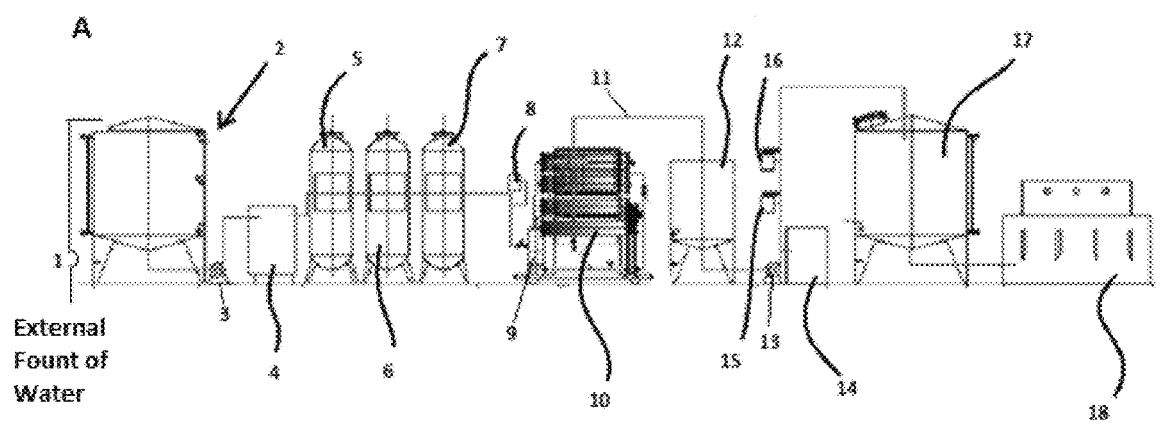
FIG. 2 depicts a system designed according to principles of the present invention, sequentially positioned.

Then, after receiving defined volumes of NaOH and KOH, by means of a high pressure pump, which operates between 8 and 10 atm, preferably 9.5 atm, not shown in FIG. 2, the water is then conducted to a precision filter (9) which aims to remove excess $K^+$ and $Na^+$ cations added to the water. At this moment, the water is already at about 40° C. since the passage through the filter sequence results in heat loss.

The water then passes through a double reverse osmosis system (10).

Then, as already mentioned, the measurement of the hydrogen concentration is made through a sensor positioned in the flow of passing water (11) which is connected to the means of adding the strong base, such as NaOH and KOH (8) and occurs adding a corresponding volume of such base until the desired pH is reached.

The water is then stored in an intermediate tank (12).

When leaving the tank (12), by means of a pump (13) that operates between 0.1 and 0.3 atm, preferably 0.2 atm, the water is pumped through the pipes of the system and receives the ozone from the ozone generator (14).

Then, by means of addition of mineral salts (15) and means of addition of magnesium salts (16), the water flow receives mineral salts and magnesium salts. Such salt addition means comprise 2 small reservoirs comprising a solution of mineral salts and magnesium salts in each and small infusion pumps, not shown in the figure, which add the desired amount of mineral salts and magnesium salts. The solution of mineral salts can vary in concentration between 20 and 40 mg/Liter, preferably, 30 mg/Liter and the solution of magnesium salts can vary in concentration between 20 and 60 mg/Liter, preferably, 40 mg/Liter.

The water is then stored in a final tank (17) and subsequently conveyed to a set of machines for filling single packages (18).

Figure 3:
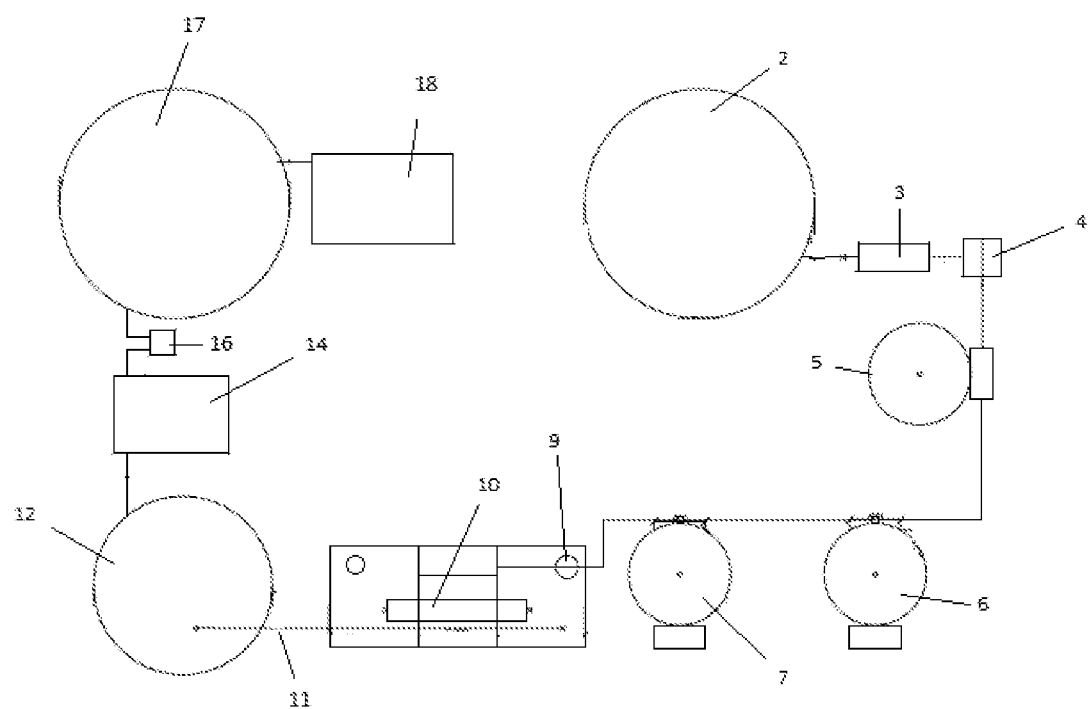
FIG. 3 depicts a top view of the system in FIG. 2 showing the spatial arrangement of the system equipment of the present invention.

An example of the system of the present invention is presented in a sequential line in FIG. 2. Such equipment is spatially conditioned in an area of 240 m², and 2 m in height, requiring the volume of 480 m³ to install the equipment as shown in FIG. 3. Alternatively, the system it could be powered by a pressurized water source.

The interchangeable plate heat exchanger (4) serves for increasing the temperature between 40° C. and 80° C., preferentially, between 55° C. and 65° C., and therefore, for lowering its density, superficial tension and viscosity, in order to facilitate the subsequent filtering step.

Following passageway through the first interchangeable plate heat exchanger (11), the water between 40° C. and 60° C. is received in silica filter (12), whose function is to remove suspended solid particles with sizes between 20 e 100 microns. The water flow through such element is facilitated through reduction of its density, superficial tension and viscosity, which is allowed through previous heating.

Subsequently, water leaving the silica filter (12) is received in activated carbon filter (13), this time, at a deliberately lower temperature, ideally ranging from 30° C. to 60° C., preferentially, in the range of 35° C. to 45° C., due to heat loss during its passageway through silica filter. The function of activated carbon filter (13) is to remove chlorine, algae, colorful substances, aromatic compounds and other substances that may grant strange flavor to water.

Next, water is received in ion exchanger (14). In such point, the water flows in close contact with resin granules of cation and anion ion exchange, with broad surface, whose function is to remove, by means of chemical affinity, undesirable metal ions, mainly heavy metals.

Following the ion exchanger (14), the passing water is then added, by means of addition (8) not shown in the figure, with defined volumes of aqueous solutions with strong bases such as, for example, NaOH or KOH, to adjust the hydrogen concentration according to the sensor reading (11). Such means of addition comprise two small reservoirs each containing aqueous solutions of NaOH and KOH and pumps for infusing volumes of such solutions into the freshly filtered water. The NaOH solution in the reservoir should have a concentration ranging between 8 and 12%, preferably 10%, and the KOH solution should have a concentration ranging between 8 and 12%, preferably 10%.

Then, the passing water is taken to the precision filter (9) whose function is to retain the $K^+$ and $Na^+$ cations added when adjusting the pH.

After the ion exchanger, the water is then conducted by the double reverse osmosis system (16), whose function is to separate, through ultrafine membranes, the permeate liquid (pure water) from the waste composed of salts, organic substances, all and any contaminating particle in suspension with dimensions above 5 microns, in addition to 99.9% of the bacteria possibly present.

In the subsequent stage of the process, the water passes through the ozonizer system (14), in which the gaseous ozone ($O_3$) produced in the equipment is abundantly bubbled into the passing water, guaranteeing 100% of the mortality of any type of cell life (algae, bacteria, yeasts, fungi, etc.) and oxidizing any trace of organic matter. This step in the process guarantees purity, lightness, freshness and a 2-year validity for bottled water.

An example of the system of the present invention is shown in FIG. 3, where the equipment was placed in an area of 240 m² and 2 m high, resulting in a volume of 480 m³ of installation. A system built according to the system in FIG. 3 is capable of purifying and filling 5,000 liters per hour. In other words, a system built according to FIG. 3 is capable of producing about 10 liters/m³ of installation, in 1 hour.

The system of the present invention, will guarantee to the passing water, 100% of the mortality of any type of cell life such as heterotrophic bacteria, total coliforms, *Echerichia coli* (algae, bacteria, yeasts, fungi, etc.), and oxidizing any trace of matter organic. This process guarantees purity, lightness, freshness and 2-year validity for bottled water.

In the process of the present invention, an absolutely pure water is thus obtained, but its composition will still be properly balanced, in order to achieve the disruptive and unprecedented standards of health for human consumption. Here, for human consumption, it is understood not only the simple consumption of water, but also the preparation of beverages with water, alkalized and with a high concentration of magnesium salts, especially hospital beverages, soft drinks, jellies, juices, teas, flavored waters and other solutions, mixtures and colloids that use water as a solvent or excipient vehicle.

At this moment, the pH is controlled and adjusted (8), by measuring the pH using a sensor (11) and a metering pump (8) (not shown in the figure), whose function is the balanced and automatic addition sodium bicarbonate, which, by chemical affinity, leaves the sodium ions in the water in the form of sodium hydroxide, leading to the adjustment of the concentration of hydrogen ions ($H^+$). The control is done so that the final product has an alkaline pH between 7.0 and 12.0, preferably between pH 8.5 and 10.5.

Water is then carried to pass through means for adding salts (15 and 16). In such point, water is added with a premix containing Himalayan Pink Salt and magnesium salts, in order to merge up to 94 types of mineral salts (15), with high hydrating and repository strength, among which Magnesium salts are highlighted. It should be noted that Himalayan Pink Salt by itself has already Magnesium salts, being the third major concentration element. Such metal is very present in Himalayan soil, containing ores such as magnesite ($MgCO_3$), dolomite ($CaMg(CO_3)_2$) and brucite ($Mg(OH)_2$), compounds presenting percentage of 46.6%, 22% and 69%, respectively, of Magnesium and they are used for commercial element extraction (according to gathering performed on 2009 by the Ministry of Oil and Geological Resources of Pakistan). Nonetheless the presence of Magnesium in Himalayan Salt, premix may contain other Magnesium sources (16), with purpose of increasing or controlling its concentration such, e.g., by adding Magnesium Chloride. As seen by FIG. 2, in the present example, we opted for subdivided means for adding salts (15), and means for adding magnesium salts (16). That is, the means of adding salts can be subdivided, presenting exclusive means for adding magnesium salts.

Here, it should be noted that differentiation made between means for adding salts (15 and 16), and means for controlling pH (8 and 11), the last one, despite also measuring the concentration of salts, such e.g. Sodium Hydroxide, aims for controlling water pH, as already explained. It occurs that, in human body, normal blood pH should be maintained within narrow range (7.35-7.45) for suitable functioning of metabolic processes and for delivering right amounts of oxygen in the tissues. Metabolism generates big amounts of acids requiring be neutralized or eliminated for maintaining acid-base balance. Lungs and kidneys are the main organs involved in blood pH regulation, where blood buffer systems (hemoglobin, plasma proteins, bicarbonates and phosphates) also contribute for their pH regulation to 7. It is worth emphasizing that pH value of food and drinks is not necessarily related to alkalinizing/acidifying effect in organism.

Alkalinizing or acidifying power in a food is determined from its sulfate, chloride, phosphorus, potassium, magnesium, sodium and calcium content, and it may be calculated through PRAL (potential renal acid load, in Portuguese, carga ácida renal potencial). PRAL is a mathematic calculation created by Thomas Remer and Friedrich Manz, on 1995, allowing the straight assessment of the abovementioned components in a food. More negative the PRAL value, more alkalinizing the food is. The consumption of alkalinizing food and drinks (i.e., those presenting negative PRAL) has clear impact on acid-base balance in body. In case of water, it is known that higher concentration of Magnesium and/or Bicarbonate, lower the PRAL value is. In this sense, drinkable alkalinizing water consumption has obtained prominence. Several studies have been noted beneficial potential of alkalinizing diets, highlighting muscle mass preservation in elderly people and bone health support. In the present system, means for adding salts (18) will adjust the PRAL value of process-resulting water, to the range of −1 to −3.

Calculation of a PRAL value may be accomplished through the following formula, suited for mineral waters: PRAL=[0.00049 $SO_4$(mg)]+[0.027 Cl(mg)]+[0.037 P(mg)]−[0.21 K(mg)]−[0.026 Mg(mg)]−[0.413 Na(mg)]−[0.013 Ca(mg)] (source: Revista Nutrire. 2015 Dec; 40(3): 344-351, available at the following electronic address: http://dx.doi.org/10.4322/2316-7874.78015).

At the end of such step, we obtained a pure water showing a PRAL value suitable for human consumption, between −1 and −3, which presents hydrogenionic concentration in the range comprised between pH of 7.0 and 12, preferentially, pH between 8.5 to 10.5, unique availability of 94 mineral salts, specially, magnesium content between 20 e 60 mg per liter of water, preferentially, above 40 mg per liter. This water hydrates more than regular mineral waters due to its low surface tension and differentiated molecular structure it has more oxygen, it is antioxidant, ionic and ozonated, Water being stored in a tank (17).

System also comprises a set of packaging machines for unit packs (18), with aim to package the process-resulting water for later distribution close from its production. In this case, a suitable packaging solution would be in tamper-resistant packages of a mixture of LDPE and LDPE with linear monomer structure which is obtained by the cold rolling process.

According to example of FIG. 2, the system comprises a packaging module (18) of volumetric injection kind with thermal weld, able for packaging 4 to 8 thousand sachets of water (30) by hour, as illustrated by FIG. 3, in which a typical volume of this packaging kind may range from 150 mL to 1,500 mL.

Figure 4:
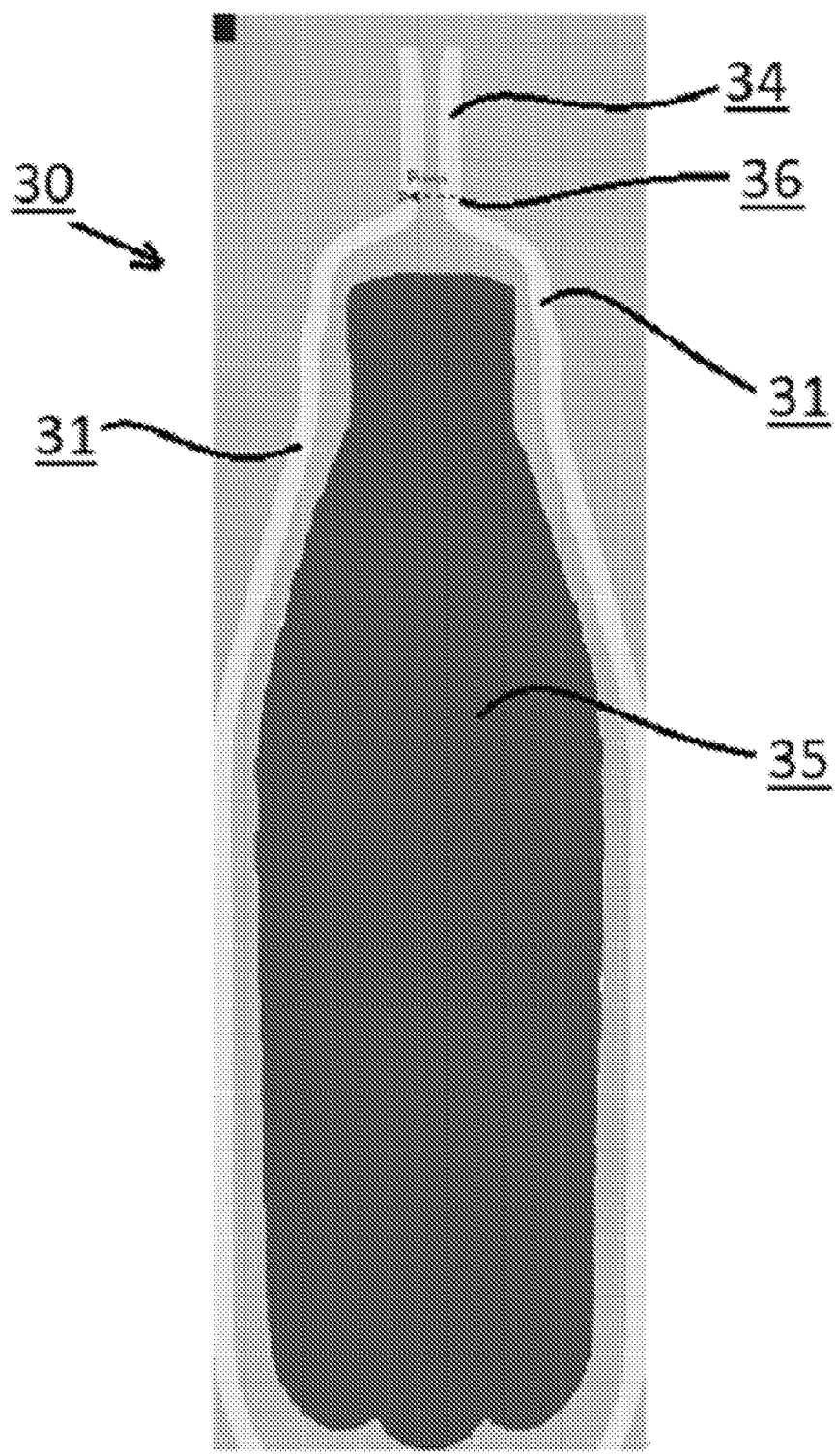
FIG. 4 depicts a filling (3) according to the principles of the present invention.

It should be noted that sachet (30) of FIG. 4 is comprised by LDPE films with linear monomeric LDPE bonded by weld lines (31), the contour of weld lines simulating, preferentially, the shape of a traditional bottle, showing a neck (34). In the neck, the user may cut or, alternatively, tear the neck (34) in order to access the content through an opening in the neck (34), and to drink the packaged water.

The process for opening the neck (34) is permanent, making the packaging (30) proof of reuse.

Sachet (30) shows printed information in its body. Printings (35) are performed externally on the sachet itself, previously printed, since that preferentially packaging module (18) will be fed with sachet designed in low density polyethylene (LDPE) films, previously manufactured.

Still preferentially, printings (35) include useful information to users, such as, e.g., sachet volume, legal information, a water bottle silhouette, or the object that may be more convenient.

Sachet may include a line (36), indicating to user the best portion of neck (34) to perform the sachet opening (30). Said neck opening (34) will allow the user to insert a straw or to force the water output through application of a pressure in sachet sides, aiming to consume the packaging water.

The description of example presented herein does not exclude other possible embodiments and arrays comprised in the scope of the present invention, and therefore it should not be considered in a limitative way. In this sense, one skilled in the art may make use of several arrays of sensors and controllers, tanks and pumps with the purpose of controlling a system designed according to principles of the present invention.

The invention claimed is:

1. A system for the purification and physical-chemical adjustment of water for human consumption, comprising:
   a pump that:
      captures water from the water table or other water source; and
      provides the captured water to in a tank, from the tank pressure pump:
         conducts the water to an interchangeable plate heat exchanger that heats the water to 60° C.; and
         leads it to a pressure silica filter followed by a pressure active carbon filter and an ion exchanger after which there is a first inlet for addition of strong bases to adjust the hydrogen concentration, wherein the pressure pump has a higher pressure than the pump;
   wherein the system is capable of operation such that:
      the water is conducted to a filter to retain K+ and Na+ cations, and then to a reverse osmosis system to obtain passing water therefrom;
      the passing water is then evaluated by a hydrogen concentration sensor which is connected to a second inlet for adding the strong bases to adjust the hydrogen concentration between pH 7 and 12 and then stored in a storage tank;
      a second pressure pump provides the passing water to a system that receives ozone from an ozone application system and then the passing water receives mineral salts through a salt addition inlet with 94 mineral salts;
      the passing water is then added with magnesium salts between 20 and 60 mg/Liter by magnesium salt inlet; and
      the passing water is then stored in a second tank and subsequently carried to a set of machines for filling in sachets, constructed with a mixture including low density polyethylene (LDPE), wherein the sachets are configured to be used for filling only once, the sachets comprising weld lines; wherein
      the contour of cold weld lines mainly simulating the shape of a bottle, showing a neck and a line, indicating to user the best portion of neck for performing the opening of the sachet or to insert a straw or to force the water output through application of a pressure in sachet sides that has external printings including information to users.

2. The system according to claim 1, wherein the system is configured for producing water showing hydrogen_ion concentration in the range from pH 8.5 to 10.5 with higher oxygen content.

3. The system according to claim 1, wherein the system is configured for producing water showing a PRAL value between 1 and 3, wherein the water is isotonic, ionic and ozonated.

4. The system according to claim 1, the system occupying a volume of 480 m$^3$.

5. The system as described in claim 1, wherein the system is configured for producing at least 10 liters of mineralized water per m$^3$ of installed machinery, by hour.

6. The system according to claim 1, wherein the strong bases are NaOH and KOH.

7. A method of using the system, as described in claim 1, for the preparation of beverages, soft drinks, jellies, juices, teas, flavored waters, and other solutions, mixtures and colloids that use water as solvent or excipient carrier.

* * * * *